United States Patent [19]

Chow

[11] Patent Number: 5,706,397
[45] Date of Patent: Jan. 6, 1998

[54] SPEECH RECOGNITION SYSTEM WITH MULTI-LEVEL PRUNING FOR ACOUSTIC MATCHING

[75] Inventor: Yen-Lu Chow, Saratoga, Calif.

[73] Assignee: Apple Computer, Inc., Cupertino, Calif.

[21] Appl. No.: 539,346

[22] Filed: Oct. 5, 1995

[51] Int. Cl.⁶ .................. G10L 5/06; G10L 9/00
[52] U.S. Cl. .......... 395/2.52; 345/2.5; 345/2.51; 345/2.65
[58] Field of Search .............. 395/2.5, 2.51, 395/2.52, 2.53, 2.6, 2.63, 2.64, 2.65

[56] References Cited

U.S. PATENT DOCUMENTS

| | | | |
|---|---|---|---|
| 4,819,271 | 4/1989 | Bahl et al. | 395/2.6 |
| 4,977,598 | 12/1990 | Doddington et al. | 395/2.6 |
| 5,027,406 | 6/1991 | Roberts et al. | 381/43 |
| 5,241,619 | 8/1993 | Sshwartz et al. | 395/2 |
| 5,349,645 | 9/1994 | Zhao | 395/2.64 |
| 5,384,892 | 1/1995 | Strong | 395/2.52 |
| 5,386,494 | 1/1995 | White | 395/2.84 |
| 5,515,475 | 5/1996 | Gulpa et al. | 395/2.51 |
| 5,581,655 | 12/1996 | Cohen et al. | 395/2.54 |

OTHER PUBLICATIONS

Laface et al., "A Fast Segmental Viterbi Algorithm For Large Vocabulary Recognition", ICASSP 'May 1995, vol. 1, pp. 560–563.

Picone. "Continuous Speech Recognition Using Hidden Markov Models", IEEE 'Jul. 1990, vol. 7, pp. 26–41.

Schwartz et al, "The Best Algorithm: An Efficient And Exact Procedure For Finding The N Most Likely Sentence Hypotheses" ICASSP '90, pp. 81–84.

*Primary Examiner*—Allen R. MacDonald
*Assistant Examiner*—Patrick N. Edouard
*Attorney, Agent, or Firm*—Blakely, Sokoloff, Taylor & Zafman

[57] ABSTRACT

A method of constructing a new active list of phone models from an existing active list of phone models during acoustic matching of a speech recognition system is described. A vector quantized speech vector is compared against each of the phone models in the existing active list to obtain a phone best score for each of the phone models of the existing active list. A best phone best score is determined among all the phone best scores of the phone models to obtain a global best score. A phone model of the phone models from the existing active list is added to the new active list of phone models if the phone best score of that phone model is within a first predetermined value of the global best score. A next phone model of the existing phone of the existing active list is added to the new active list if the phone ending score of that existing phone is within a second predetermined value of a best score of the existing phone model. A next (e.g. first) phone model of a next word of a particular phone model of the existing active list is added to the new active list if the ending score of that particular phone model is within a third predetermined value of the global best score.

21 Claims, 7 Drawing Sheets

SPEECH RECOGNITION SYSTEM WITH MULTI-LEVEL PRUNING FOR ACOUSTIC MATCHING

FIELD OF THE INVENTION

The present invention pertains to the field of speech recognition systems. More particularly, this invention relates to a speech recognition system with pruning for acoustic matching.

BACKGROUND OF THE INVENTION

In speech recognition, Hidden Markov models (HMMs) are often used. When an HMM speech recognition system is built, each word in the recognizable vocabulary is defined as a sequence of sounds, or a fragment of speech, that resemble the pronunciation of the word. A Markov model for each fragment of speech is created. The Markov models for each of the sounds are then concatenated together to form a sequence of Markov models that depict an acoustical definition of the word in the vocabulary. Typically, a computer system is programmed to operate as a speech recognition system by programming the computer to include these Markov models. For example, in FIG. 1, a phonetic word 10 for the word "TEN" is shown as a sequence of three phonetic Markov models 11 through 13. One of the phonetic Markov models (or phone models) represents the phonetic element (or phone) "T" 11, having two transition arcs 11A and 11B. A second of the phonetic Markov models represents the phonetic element (or phone) "EH", shown as model 12 having transition arcs 12A and 12B. The third of the phonetic Markov models (i.e., model 13), represents the phonetic element (or phone) "N" having transition arcs 13A and 13B.

Figure 1:
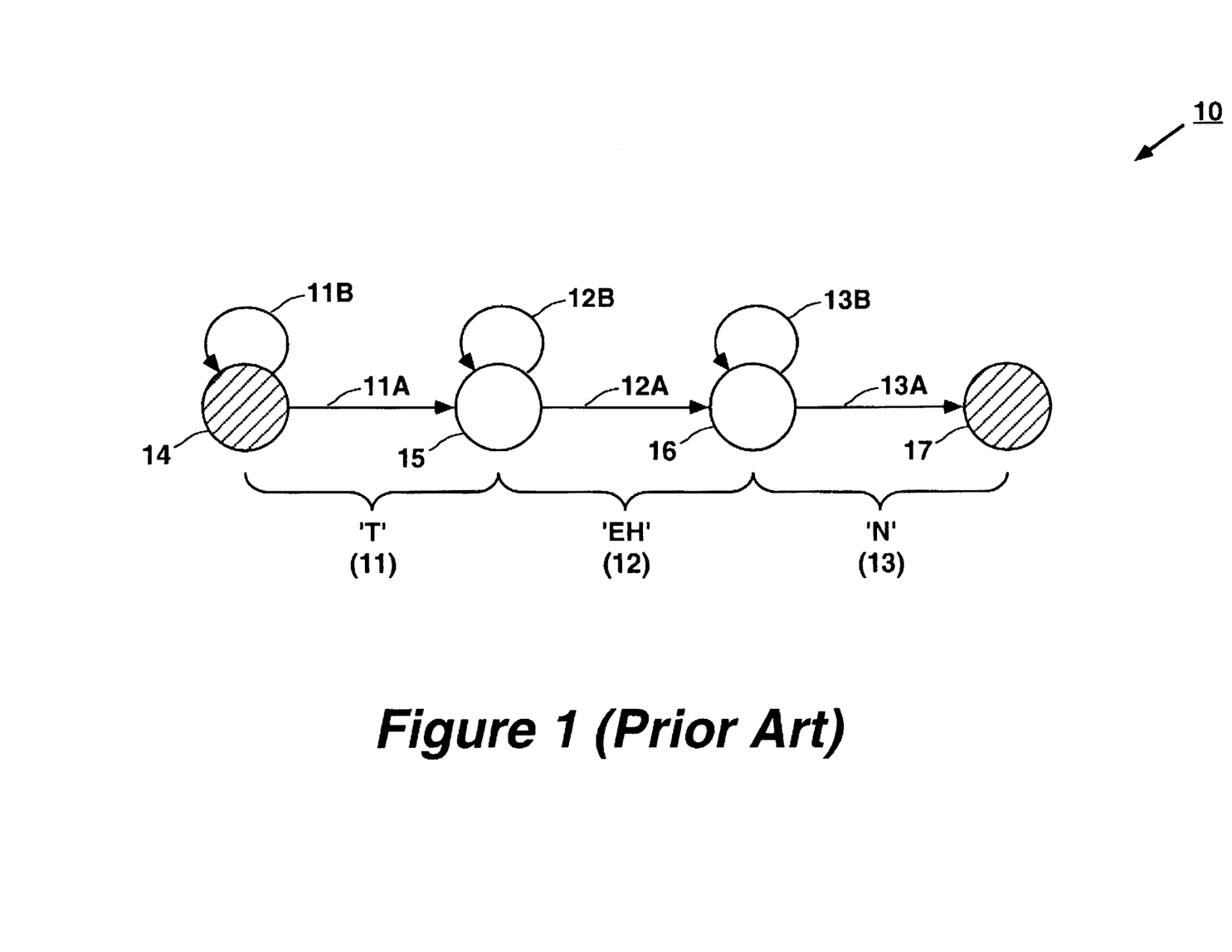
FIG. 1 illustrates an example of a hidden Markov model for the word "TEN"

Each of the three Markov models shown in FIG. 1 has a beginning state and an ending state. The "T" model 11 begins in state 14 and ends in state 15. The "EH" model 12 begins in state 15 and ends in state 16. The "N" model 13 begins in state 16 and ends in state 17.

Figure 2:
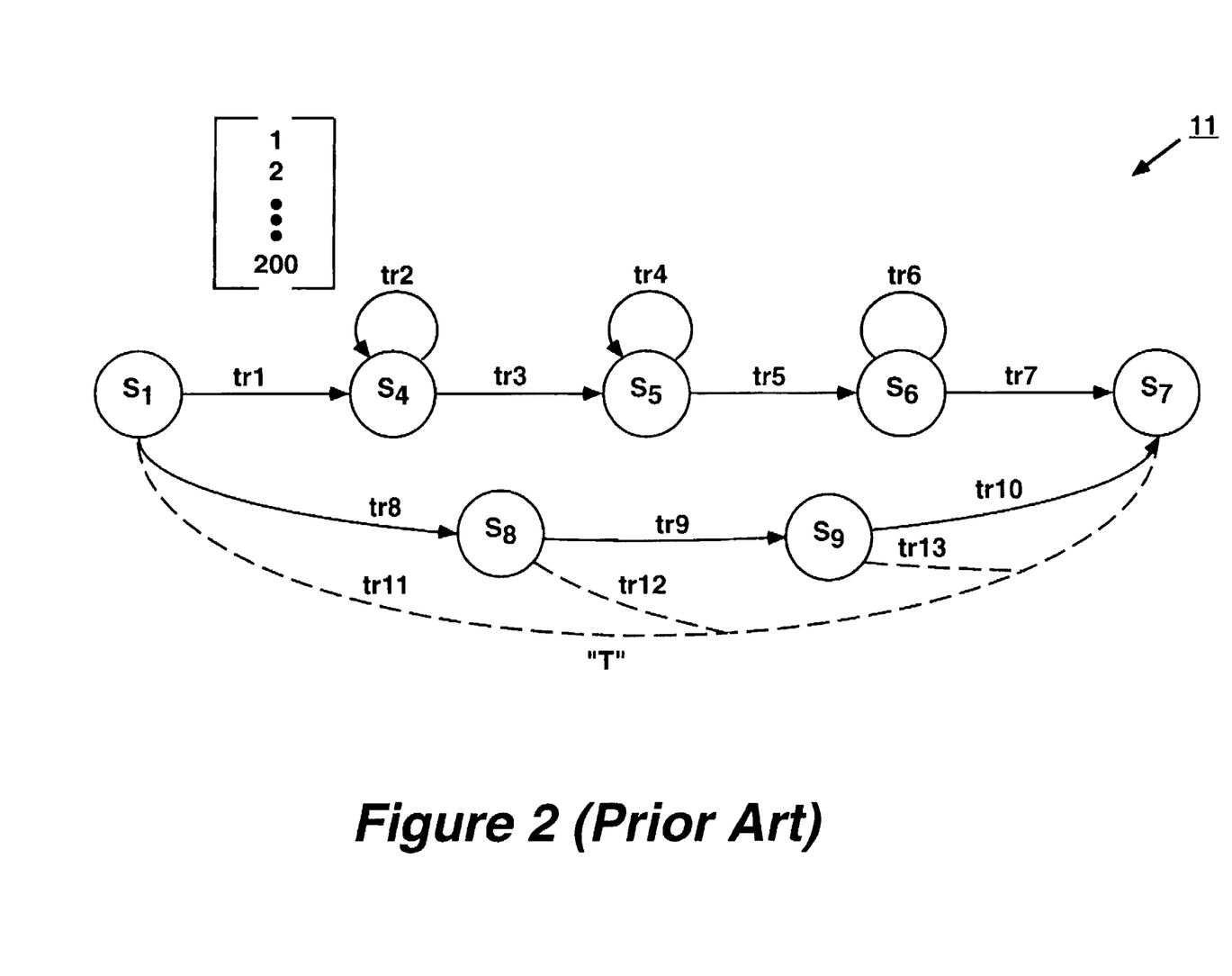
FIG. 2 shows one of the phonetic hidden Markov models of FIG. 1 in more detail.

FIG. 2 shows in more detail phonetic Markov model 11 for the letter "T". As can be seen from FIG. 2, Markov model 11 actually has states between their respective beginning and ending states. Multiple arcs extend and connect the states. During a conventional training stage, a probability is determined for each arc and for non-null arcs (represented with solid lines) and label output probabilities are determined. Each label output probability corresponds to the likelihood of a label being produced at a given arc when the arc is followed.

During recognition, a speech utterance is digitized in a digital representation which is converted into a set of speech vectors (e.g. vector quantized speech vectors) that are compared with a set of phonetic Markov models, starting from the leftmost state of the leftmost model, such as state $S_1$, and progressing according to the arrows through the intermediate states to the rightmost state of that model, such as state $S_7$, where model 11 moves to the states of the next model or terminates in a manner well-known in the art.

The comparison of the speech vectors with the phonetic Markov models is done using a procedure known as a Viterbi search. The well known Viterbi procedure is also referred to as Viterbi beam search when beam based pruning of the HMMs is used. The Viterbi procedure determines the best path of an unknown utterance through the given set of Markov models. Briefly, the Viterbi procedure, when used with beam based pruning, compares a speech vector as it comes in time with each of a set of phonetic models within a current active list of phonetic Markov models to find (1) a phone best score for each of the phonetic Markov models and (2) a global best score that is the best score of all the phonetic Markov models of the active list. Then the phone best score of each of the phonetic Markov models is compared with the global best score to determine if the phone best score of the phonetic Markov model is within a predetermined value (i.e., within the beam) of the global best score. That phonetic Markov model is added to the new active list of phonetic Markov models only if the phone best Score of that phonetic Markov model is within the predetermined value of the global best score. In doing so, a substantial number of phonetic Markov models can be eliminated ("pruned") from the active list of phonetic Markov models during the comparison and the spoken word or words can be found more efficiently than if the active list of phonetic Markov models is not pruned.

However, the prior art acoustic search process using the known Viterbi procedure with beam based pruning, still has disadvantages. One disadvantage is that the prior art Viterbi procedure with beam based pruning still requires the speech recognition system to process a relatively large number of active models especially when the vocabulary is large. This typically causes the speech recognition system to have difficulty in performing the speech recognition in real time. Moreover, processing the large number of models typically requires a relatively large memory. This causes the cost of the system to increase significantly.

SUMMARY OF THE INVENTION

One of the features of the present invention is to provide multi-level pruning for an acoustic matching search which is guided by a language model in a speech recognition system.

Another feature of the present invention is to provide multi-level pruning for phones, phone extensions, and word extensions, wherein the pruning of phone extensions are based on the difference of ending score relative to the maximum score (i.e., phone best score) within the phone model for that speech frame.

A further feature of the present invention is to allow real-time speech recognition in a cost effective manner.

A method of constructing a new active list of phone models from an existing active list of phone models during acoustic matching of a speech recognition system is described. A speech recognition apparatus which constructs a new active list of phone models is also described. A vector quantized speech vector is compared against each of the phone models in the existing active list to obtain a phone best score for each of the phone models of the existing active list. A global best score is determined from all the phone best scores of all the phone models, which is typically all of the active phone models. A phone model from the existing active list is added to the new active list of phone models if the phone best score of that phone model is within a first predetermined value of the global best score. This use of the first predetermined value prunes the active list to a first level. Two further levels of pruning may be provided by the invention. In the first further level of pruning, a next phone model of the existing phone of the existing active list is added to the new active list if the phone ending score of that existing phone is within a second predetermined value of a best score of the existing phone. A second further level of pruning may be used by using a third predetermined value. A first phone model of a next word of a particular phone model of the existing active list is added to the new active list if the ending score of that particular phone model is within the third predetermined value of the global best score.

These three levels of pruning of the active list may be used separately or together in various combinations. The pruning which uses the second predetermined value may be referred to as a pruning using a phone extension beam, and the pruning which uses the third predetermined value may be referred to as a pruning using a word or class ending/propagation beam.

The apparatus of the present invention typically prunes and stores the active list in memory (e.g. RAM) of a computer system and a processor (e.g. a microprocessor) of the system typically performs the pruning and acoustic matching process through the HMMs which are pruned.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 3:
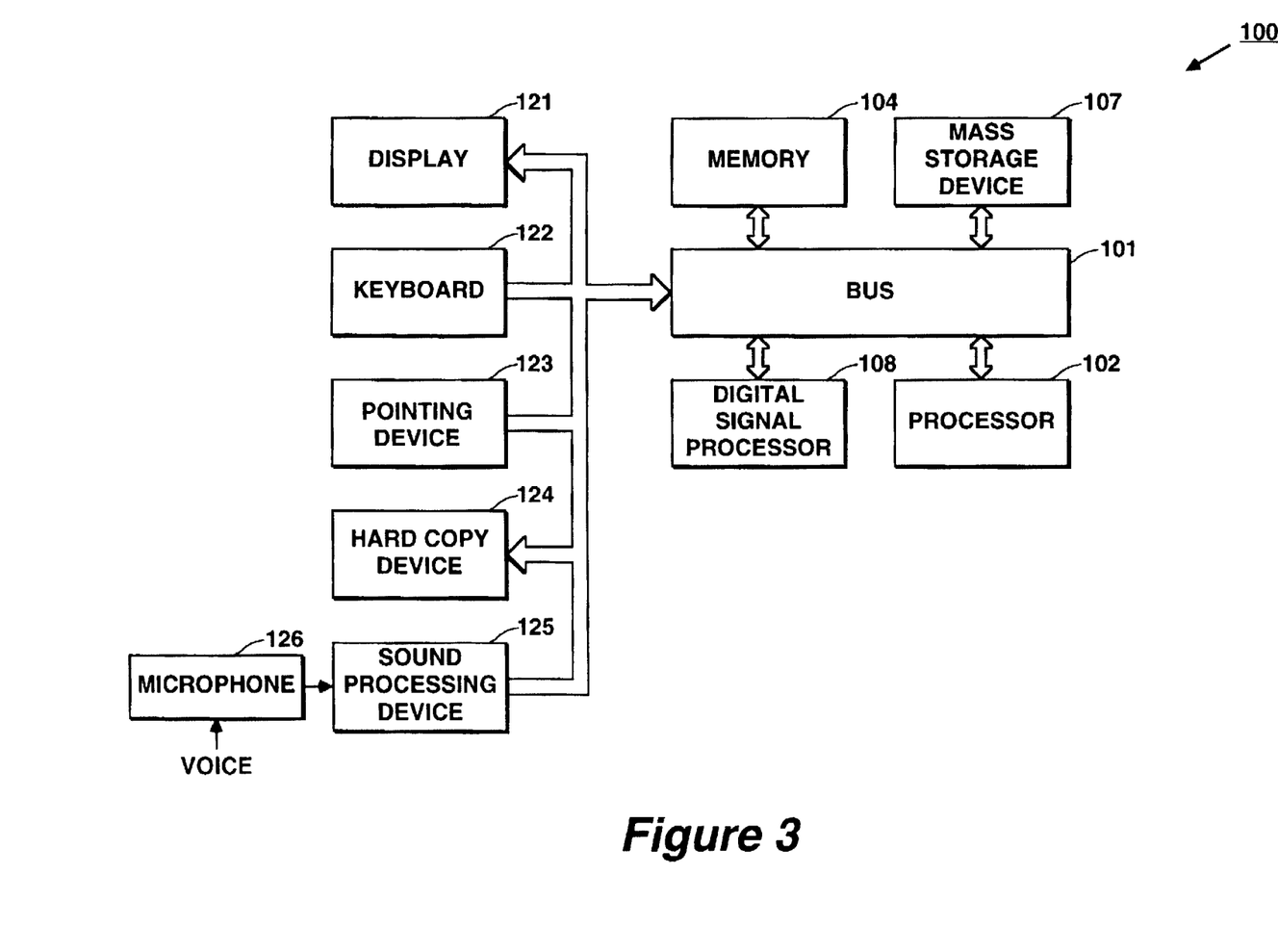
FIG. 3 shows a computer system that implements a speech recognition system.

FIG. 3 illustrates a computer system 100 that implements the speech recognition system on which the multi-level pruning arrangement of the present invention may be implemented. Although FIG. 3 shows some of the basic components of computer system 100, it is neither meant to be limiting nor to exclude other components or combinations of components.

Referring to FIG. 3, computer system 100 includes a bus 101 for transferring data and other information. Computer system 100 also includes a processor 102 coupled to bus 101 for processing data and information. Computer system 100 also includes a memory 104 and a mass storage device 107 coupled to bus 101. Memory 104 typically stores information and instructions to be executed by processor 102. Mass storage device 107 stores information (e.g. a language model and HMMs) and instructions (e.g. computer programs for acoustic matching and pruning of HMMs) that usually need to be loaded into memory 104 before being executed by processor 102. Device 107 is a computer readable medium which contains the executable programs.

Computer system 100 also includes a digital signal processor 108 for performing digital signal processing function that offers additional processing bandwidth. Alternatively, computer system 100 does not include the digital signal processor 108 and the digital signal processing function is performed by processor 102.

Computer system 100 may further include a display device 121 coupled to bus 101 for displaying information to a computer user. Keyboard input device 122 is also coupled to bus 101 for communicating information and command selections to processor 102. An additional user input device is a cursor control device 123, such as a mouse, a trackball, a trackpad, or cursor direction keys, coupled to bus 101 for communicating direction information and command selections to processor 102, and for controlling cursor movement on display 121. Cursor control device 123 typically includes a signal generation device (e.g. a button) for providing signals to processor 102, which signals indicate the command selections. Another device which may be coupled to bus 101 is a hard copy device 124 which may be used for printing instructions, data, or other information on a medium such as paper, film or similar types of media. System 100 may further include a sound processing device 125 for digitizing sound signals and transmitting such digitized signals to processor 102 or digital signal processor 108 via bus 101. In this manner, sound may be digitized and then recognized using processor 108 or 102 or both processors. Sound processing device 125 is coupled to an audio transducer such as a microphone 126. Sound processing device 125 typically includes an analog-to-digital (A/D) converter and may be implemented by well known sound processing circuits. In addition, microphone 126 can be implemented by any known microphone or sound receiver.

In one embodiment, system 100 is one of the Macintosh® brand family of personal computers available from Apple Computer, Inc. of Cupertino, Calif. Processor 102 is one of the Motorola 680x0 family of processors available from Motorola, Inc. of Schaumburg, Ill., such as the 68020, 68030, or 68040. Alternatively, processor 102 may be a PowerPC RISC processor also sold by Motorola Inc. Processor 108, in one embodiment, comprises one of the AT&T DSP 3210 series of digital signal processors available from American Telephone and Telegraph (AT&T) Microelectronics of Allen Town, Pa.

Figure 4:
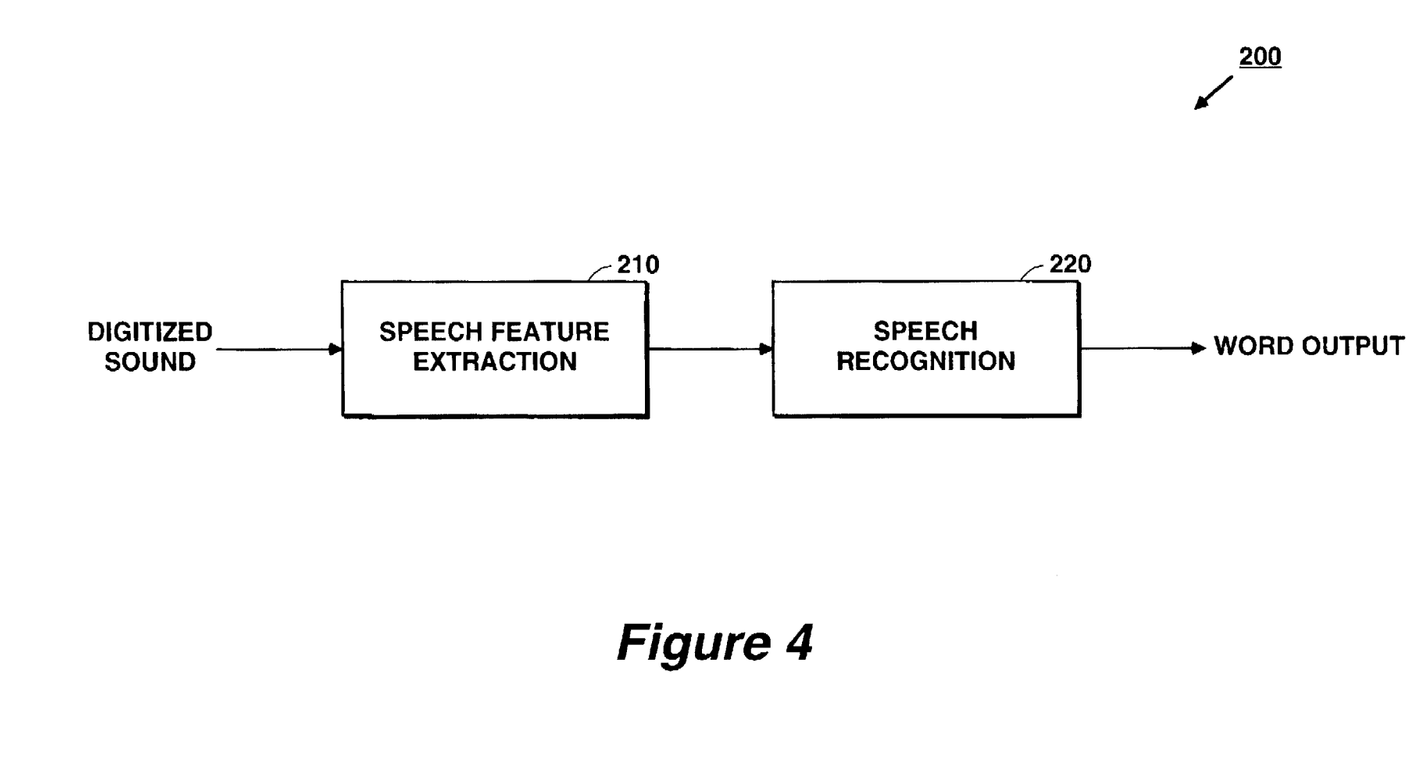
FIG. 4 shows the speech recognition system implemented by the computer system of FIG. 3, wherein the speech recognition system includes a speech recognition process.

Computer system 100 includes a speech recognition system 200 (shown in FIG. 4). For one embodiment, speech recognition system 200 is implemented as a series of software routines that are run by processor 102, which interacts with data received from digital signal processor 108 via sound processing device 125. It will, however, be appreciated that speech recognition system 200 can also be implemented in discrete hardware or firmware, or by a combination of software and/or hardware. FIG. 4 shows speech recognition system 200 in functional block diagram form.

In one embodiment, speech recognition system 200 is a Chinese language speech recognition system. Alternatively, speech recognition system 200 can be any other kind of pictographic language speech recognition system. For example, speech recognition system 200 can be a Japanese or Korean language speech recognition system. In addition, speech recognition system 200 can be a non-pictographic language speech recognition system (e.g. a system for recognizing English speech).

Referring to FIG. 4, digitized sound signal is fed from sound processing device 125 (shown in FIG. 3) to a speech feature extraction process 210 which is otherwise known as the "front end" of speech recognition system 200. Speech feature extraction process 210 is performed, in one embodiment, by digital signal processor 108 (FIG. 3). This feature extraction process 210 recognizes, using known techniques, acoustic features of human speech, as distinguished from other sound signal information contained in the digitized sound signal. In this manner, features such as phones or other discrete spoken speech units may be extracted, and analyzed to determine whether words are being spoken. The acoustic features extracted in speech feature extraction process 210 are presented as a sequence of speech frames or a sequence of quantized speech data vectors to a speech recognition process 220. Spurious noises such as background noises and user noises other than speech are ignored using conventional techniques. Speech feature extraction process 210 can be implemented by any known technique and means.

The acoustic features from speech feature extraction process 210 are input to a speech recognition process (also called recognizer processor) 220 which performs speech recognition using a language model to determine whether the extracted features represent expected words in a vocabulary recognizable by the speech recognition system. In one embodiment, recognizer process 220 uses a recognition algorithm to compare a sequence of speech frames or a sequence of a quantized speech data vectors produced by an utterance with a sequence of nodes contained in the acoustic model of each word under the guidance of the language model to determine if a match exists. The comparison is done using a known Viterbi procedure or Viterbi beam search procedure in connection with a multi-level pruning arrangement in accordance with one embodiment of the present invention. The result of the recognition matching process is a text output which is then shown on the display. Details of recognizer process 220 are shown in FIG. 5, which will also be described in more detail below.

Figure 5:
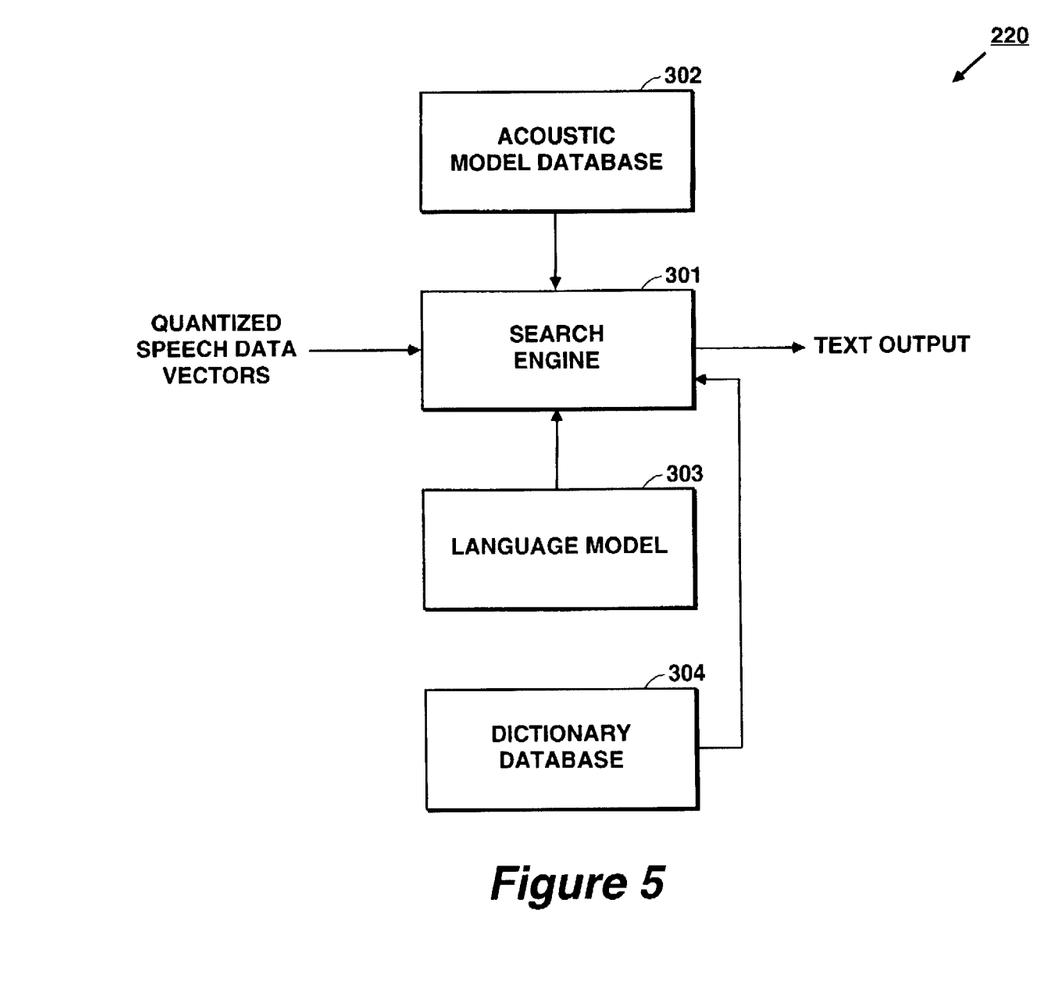
FIG. 5 shows the speech recognition process of FIG. 4, wherein the speech recognition process includes a search engine that includes a multi-level pruning arrangement for acoustic matching in accordance with one embodiment of the present invention.

Referring to FIG. 5, recognizer 220 includes a search engine 301. In one embodiment, search engine 301 is implemented by software running on processor 102 of FIG. 3. Search engine 301 implements the recognition algorithm of recognizer processor 220. In addition, search engine 301 also implements the multi-level pruning arrangement in accordance with one embodiment of the present invention which is described in more detail below, in conjunction with FIGS. 6A–6B. Search engine 301 receives quantized speech data vectors or speech frames from speech feature extraction process 210 (FIG. 4). Search engine 301 outputs a text as a result of its acoustic matching search in accordance with the speech data vectors received and in accordance with the language model 303, which is typically stored at least in part in memory 104.

Search engine 301 is connected to an acoustic model database 302 which can be constructed in any known manner and by any known means. Acoustic model database 302 includes acoustic models of all the words that can be recognized by recognizer 200. In one embodiment of the invention, each of the acoustic models for a word is constructed to include a number of phonetic hidden Markov models or phone models. The words are stored in a dictionary database 304 of recognizer 200. Dictionary database 304 can also be constructed in any known manner and by any known means.

The recognition algorithm of search engine 301 uses, in one embodiment, well known probabilistic matching and dynamic programming for the acoustic matching process. Probabilistic matching determines the likelihood that a given frame of an utterance corresponds to a given node in an acoustic model of a word. This likelihood is determined not only as a function of how closely the amplitudes of the individual frequency bands of a frame match the expected frequencies contained in the given node models, but also as a function of how the deviation between the actual and expected amplitudes in each such frequency band compares to the expected deviations for such values.

Dynamic programming is also referred to as the viterbi beam search or Viterbi procedure. Dynamic programming provides a method to find an optimal, or near optimal, match between the sequence of frames produced by the utterance and the sequence of nodes contained in the model of the word. This is accomplished by expanding and contracting the duration of each node in the acoustic model of a word to compensate for the natural variations in the duration of speech sounds which occur in different utterances of the same word. A score is computed for each time-aligned match, based on the sum of the dissimilarity between the acoustic information in each frame and the acoustic model of the node against which it is time-aligned. The words with the lowest sum of such distances are then selected as the best scoring words. The combined score of the probability matching and dynamic programming is referred to as acoustic matching score.

Dictionary database 304 is connected to search engine 301 and stores the phonetic symbol of each of the words which is in the recognizable vocabulary of the recognizer 200. In other words, dictionary database 304 is a pronunciation dictionary database. Dictionary database 304 can be implemented by any known means.

Recognizer 200 also includes a language model 303. Language model 303 is used to guide or govern search engine 301 to perform the acoustic matching process for the speech data vectors received. In one embodiment, language model 303 is constructed in a prefix/body/suffix structure. This prefix/body/suffix structure is specially suited for searching Chinese phrases. The prefix/body/suffix structure for a language model is described in more detail in a copending application of application no. 08/538,828, entitled AN IMPROVED SEARCH ENGINE FOR PHRASE RECOGNITION BASED ON PREFIX/BODY/SUFFIX ARCHITECTURE, filed on even date as the present application by Yen-Lu Chow, and Hsiao-Wuen Hon and assigned to the same assignee of the present application.

During operation, search engine 301 receives a sequence of speech data vectors as a function of time from speech feature extraction process 210 (FIG. 4). Search engine 301 then compares each of the speech data vectors with an active list of phone models (i.e., phonetic Markov models) constructed from acoustic model database 302 under the guidance or governed by language model 303. For one embodiment, the initial active list of phone models constructed by search engine 301 includes all the phone models of acoustic model database 302. Search engine 301 then uses the known Viterbi procedure to determine the phone best score of each of the phone models in the active list compared with a given speech data vector. As can be seen from FIG. 2, each phone model may include three states. When search engine 301 compares the given speech vector against each state of this phone model, three scores are obtained. Then the best score of the three scores is obtained as the phone best score for the phone model. The phone best score can be the highest or lowest score among the three scores.

Also, search engine 301 obtains a global best score among the phone best scores of all the phone models compared with the given speech data vector using the Viterbi procedure. The global best score is the best phone best score of all the phone best scores for all the active phone models that have been compared with the given speech vector. The global best score can be the highest or lowest score of all the phone best scores.

Then search engine 301 employs the multi-level pruning arrangement of the present invention to construct a new active list of phone models for a next speech vector. Then the process continues until all of the speech vectors of the sequence of speech vectors from a speech utterance have been compared and the correct word or words have been found through the comparison. The multi-level pruning arrangement of the present invention in connection with the Viterbi procedure will be described in more detail below, also in conjunction with FIGS. 6A and 6B.

The multi-level pruning arrangement, when used along with the known Viterbi procedure, allows the best path of a speech utterance through phonetic Markov model comparison to be determined more quickly, efficiently, and cost-effectively than the prior art Viterbi procedure alone. This is due to the fact that the multi-level pruning arrangement provides pruning not only for the phones, but for phone extensions and word extensions as well. The phone extension indicates ending of the phone model. To which phone model this ending phone model is extended (or connected) then is governed by language model 303 (FIG. 5). The word extension indicates ending of the word (or class as indicated in the prefix/body/suffix class architecture described in the above noted application) for the phone model. To which word or a class of words the word of the phone model is extended or connected is governed by language model 303 (FIG. 5). By doing so, the best path through the phone models can be relatively quickly determined and unnecessary phone models can be quickly eliminated. This allows speech recognition system 200 to require relatively less active model processing, which in turn causes the processing speed of speech recognition system 200 to increase and the memory requirement of speech recognition system 200 to decrease.

Figure 6A:
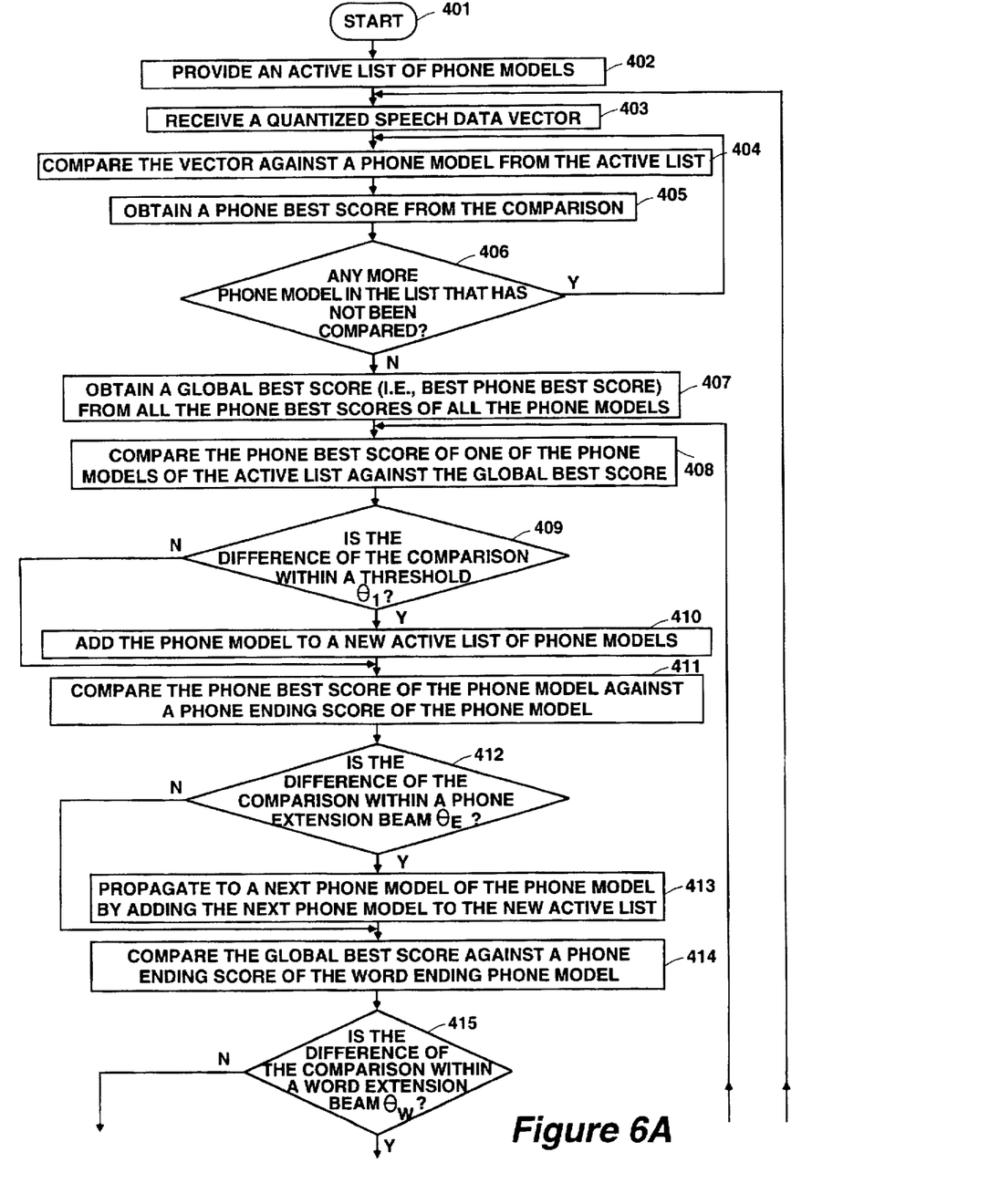
FIGS. 6A and 6B show in flow chart diagram form the multi-level pruning arrangement in accordance with one embodiment of the present invention.
Figure 6B:
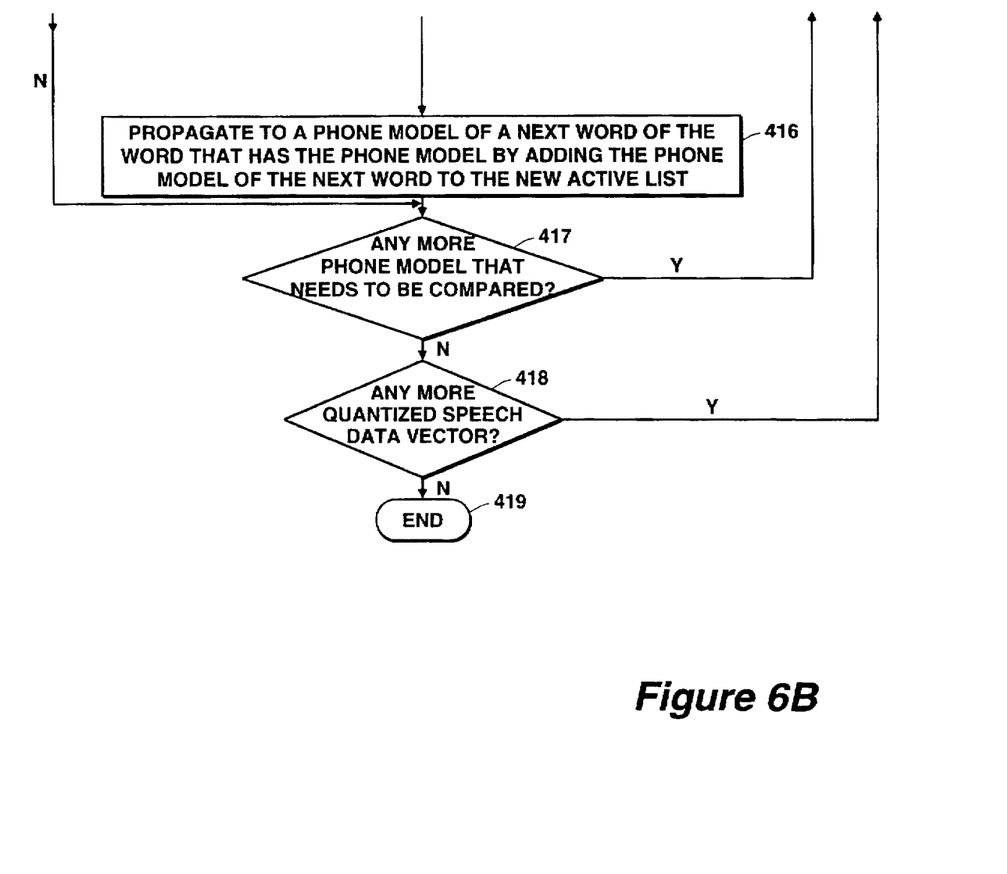

Referring to FIGS. 6A and 6B, the multi-level pruning arrangement is described. It will be appreciated that each of these levels of pruning may be used separately or together in various combinations, depending on the embodiment. It will also be appreciated that a processor (e.g. 102) in the system will perform the acoustic matching with the pruning of the active list, where the active list of phone models is typically stored in a memory, such as memory 104. At step 402, an active list of phone models is provided for comparison with a given speech vector. As described above and in one embodiment, the active list of phone models initially includes all the phone models in acoustic model database 302 (FIG. 5). At step 403, a quantized speech data vector (also referred to as speech vector) V(t) is received for comparison. Then the speech vector is compared against a phone model from the active list of phone models using the known Viterbi procedure at step 404. The comparison typically results in three scores in accordance with the Viterbi procedure. At step 405, a phone best score $S_p(t)$ is obtained from the three scores of the comparison. Then step 406 is performed at which it determines if any more phone models in the active list that have not been compared with the given speech vector V(t). If so, steps 404 and 405 are repeated to obtain the phone best score of the phone models of the active list. In doing so, a set of phone best score (i.e., $S_{p1}(t)$, $S_{p2}(t)$, ... $S_{pn}(t)$) for all the phone models of the active list of phone models are obtained.

If, at step 406, it is determined that all the phone models of the active list have been compared against the given speech vector V(t), step 407 is then performed to obtain the global best score $S_G(t)$. As described above, the global best score $S_G(t)$ is the best phone best score among all the phone best scores. At step 408, the phone best score $S_p(t)$ of one of the phone models from the active list is compared with the global best score $S_G(t)$. At step 409, it is determined if the phone best score $S_p(t)$ of that phone model is within a predetermined value $\theta_1$ of the global best score $S_G(t)$ (i.e., whether $S_G(t)-S_p(t)<\theta_1$). The predetermined value $\theta_1$ is referred to as a beam. If so, the phone model is added to the new active list of phone models for future comparison with the next speech vector of the given speech utterance at step 410. If not, step 410 is bypassed. Steps 408 through 410 implement the phone pruning of one level of the multi-level pruning in accordance with one embodiment of the present invention.

Step 411 is then performed at which the phone best score $S_p(t)$ of that phone model is compared with a phone ending score $S_E(t)$ of that particular phone model. The phone ending score $S_E(t)$, relative to the phone best score $S_p(t)$, indicates that it is the end of the phone model and the search should propagate to the next phone model of that particular phone model (usually the next phone model is still within the same word as the prior phone model). The phone ending score $S_E(t)$ is a score for the ending state of that phone model. At step 412, it is determined if the phone ending score $S_E(t)$ of that phone model is within a predetermined value $\theta_E$ of the phone best score $S_p(t)$ of that particular phone model (i.e., whether $S_p(t)-S_E(t)<\theta_E$). The predetermined value $\theta_E$ is referred to as phone extension beam. The predetermined value $\theta_E$ can be obtained through conventional training.

If, at step 412, it is determined that the phone ending score $S_E(t)$ of that phone model is within the predetermined value $\theta_E$ of the phone best score $S_p(t)$ (i.e., the search has reached end of the phone model and should propagate to the next phone model of the particular phone), then the next phone model of the phone is added to the next active list of phone models at step 413. The next phone model of the phone model is determined by language model 303 of FIG. 5. If, at step 412, it is determined that the phone ending score $S_E(t)$ is not within the predetermined value $\theta_E$ of the phone best score $S_p(t)$, then step 413 is bypassed (in this case, the search has not reached the end of a phone model for a particular phone, in which case the next phone model for the particular phone should not be added to the active list). Steps 411 through 413 implement the phone extension pruning of the multi-level pruning in accordance with one embodiment of the present invention.

Step 414 is then performed to compare the global best score $S_G(t)$ against a phone ending score $S_W(t)$ of the particular word ending phone model. At step 415, it is determined if the global best score $S_G(t)$ is within a predetermined value $\theta_W$ of the phone ending score $S_W(t)$ of that particular word ending phone model (i.e., whether $S_G(t)-S_W(t)<\theta_W$). The predetermined value $\theta_W$ determines the beam for the word of phone model and is referred to as word extension beam. This word extension beam may be obtained by conventional speech recognition training.

If, at step 415, it is determined that the difference between the global best score $S_G(t)$ and the phone ending score $S_W(t)$ of the particular word ending phone model is within the predetermined value $\theta_W$ (i.e., the current phone model is the ending phone model of the word and the search should propagate to the next phone model of the next word, or portion of word), then step 416 is performed at which a next (e.g. first) phone model of a next word of the phone model is added to the new active list of phone models. For example, as described in the application noted above for the prefix/body/suffix architecture, the first/next phone might be the first phone model of a suffix word when the search has reached the end of a body word which precedes the suffix word. Otherwise, step 416 is bypassed. Steps 414 through 416 implement the word extension pruning of the multi-level pruning of the present invention.

Step 417 is then performed to determine if the active list has any more phone models that require pruning. If so, the process repeats steps 408 through 416. If not, step 418 is performed to determine if a new speech vector has been received in search engine 301. If so, the process returns to step 403. If not, the process ends at step 419.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of constructing a new active list of phone models from an existing active list of phone models during acoustic matching of a speech recognition system, comprising the steps of:

(A) comparing a speech frame against each of the phone models in the existing active list to obtain a phone best score for each of the phone models of the existing active list;

(B) adding a next phone model of a first phone model of the phone models of the existing active list to the new active list if the phone best score of the first phone model is within a first predetermined value of a phone ending score of the first phone model.

2. The method of claim 1, further comprising the steps of (a) determining a best phone best score among all the phone best scores of the phone models to obtain a global best score;

(b) adding the first phone model to the new active list if the phone best score of the first phone model is within a second predetermined value of the global best score and wherein said first phone model is for a word.

3. The method of claim 2, wherein the phone ending score relative to the phone best score for the first phone model indicates that the acoustic matching should propagate to the next phone model of the first phone model.

4. The method of claim 3, wherein the phone ending score is obtained through training.

5. The method of claim 4, further comprising the step of (C) repeating the steps (B) and (b) for all phone models of the existing active list.

6. The method of claim 5, further comprising the steps of (i) determining if a new speech frame has been received;

(ii) repeating the steps (A) through (C) using the new active list of phone models as the existing active list if the new speech frame has been received.

7. A method of constructing a new active list of phone models from an existing active list of phone models during acoustic matching of a speech recognition system, comprising the steps of:

(A) comparing a speech frame against each of the phone models in the existing active list to obtain a phone best score for each of the phone models of the existing active list;

(B) determining a best phone best score among all the phone best scores of the phone models of the existing active list to obtain a global best score;

(C) adding a next phone model of a next word of a first phone model of the phone models of the existing active list to the new active list if the global best score is within a first predetermined value with respect to a word ending score of the first phone model.

8. The method of claim 7, further comprising the step of (D) repeating the step (C) for all phone models of the existing active list.

9. The method of claim 8, further comprising the steps of (i) determining if a new speech frame has been received;

(ii) repeating the steps (A) through (D) if the new speech frame has been received.

10. The method of claim 9, wherein the word ending score for the first phone model indicates that the acoustic matching should propagate to the next phone model of the next word of the first phone model, wherein the next phone model of the next word of the first phone model is determined by a predetermined language model.

11. The method of claim 10, wherein the word ending score is obtained through the language model.

12. The method of claim 7, further comprising the step of adding the first phone model to the new active list if the phone best score of the first phone model is within a second predetermined value of the global best score.

13. A method of constructing a new active list of phone models from an existing active list of phone models during acoustic matching of a speech recognition system, comprising the steps of:

(A) comparing a speech frame against each of the phone models of the existing active list to obtain a phone best score for each of the phone models of the existing active list;

(B) determining a best phone best score among all the phone best scores of the phone models from the existing active list to obtain a global best score;

(C) adding a first phone model of the phone models from the existing active list to the new active list of phone models if the phone best score of the first phone model is within a first predetermined value of the global best score;

(D) adding a next phone model of the first phone model to the new active list if the phone best score of the first phone model is within a second predetermined value of a word ending score of the first phone model;

(E) adding a next phone model of a next word of the first phone model to the new active list if the global best score is within a third predetermined value with respect to a word ending score of the first phone model.

14. The method of claim 13, wherein the predetermined phone ending score for the first phone model indicates that the acoustic matching should propagate to the next phone model of the first phone model.

15. The method of claim 14, wherein the second predetermined value is obtained through training.

16. The method of claim 13, wherein the word ending score for the first phone model indicates that the acoustic matching should propagate to the next phone model of the next word, wherein the next phone model of the next word is determined by a predetermined language model.

17. The method of claim 16, wherein the second predetermined value is obtained through training.

18. The method of claim 13, further comprising the step of (F) repeating the steps (C) through (E) for all phone models of the existing active list.

19. The method of claim 18, further comprising the step of (i) determining if a new speech frame has been received;

(ii) repeating the steps (A) through (F) using the new active list of phone models as the existing active list if the new speech frame has been received.

20. A speech recognition apparatus comprising
    an audio transducer which receives a speech utterance;

a processor coupled to said audio transducer to receive a speech frame of said speech utterance;

a memory coupled to said processor, said memory storing a plurality of phone models in an existing active list of phone models, said processor pruning said existing active list to create a new active list of phone models, said processor comparing said speech frame against each of the phone models in the existing active list to obtain a phone best score for each of the phone models of the existing active list, and adding a next phone model of a first phone model of the phone models of the existing active list to the new active list if the phone best score of the first phone model is within a first predetermined value of a phone ending score of the first phone model.

21. A speech recognition apparatus comprising an audio transducer which receives a speech utterance;

a processor coupled to said audio transducer to receive a speech frame of said speech utterance;

a memory coupled to said processor, said memory storing a plurality of phone models in an existing active list of phone models, said processor pruning said existing active list to create a new active list, said processor comparing said speech frame against each of the phone models in the existing active list to obtain a phone best score for each of the phone models of the existing active list;

determining a best phone best score among all the phone best scores of the phone models of the existing active list to obtain a global best score; and adding a next phone model of a next word of a first phone model of the phone models of the existing active list to the new active list if the global best score is within a first predetermined value with respect to a word ending score of the first phone model.

* * * * *